(12) United States Patent
Niu et al.

(10) Patent No.: US 9,892,131 B2
(45) Date of Patent: Feb. 13, 2018

(54) METHOD, ELECTRONIC DEVICE, AND STORAGE MEDIUM FOR CREATING VIRTUAL DIRECTORY

(71) Applicant: Xiaomi Inc., Beijing (CN)

(72) Inventors: Yi Niu, Beijing (CN); Chuangqi Li, Beijing (CN); Yaozhong Li, Beijing (CN); Li Tian, Beijing (CN); Hui Wang, Beijing (CN); Cheng Qian, Beijing (CN)

(73) Assignee: Xiaomi Inc., Beijing (CN)

( * ) Notice: Subject to any disclaimer, the term of this patent is extended or adjusted under 35 U.S.C. 154(b) by 176 days.

(21) Appl. No.: 14/294,797

(22) Filed: Jun. 3, 2014

(65) Prior Publication Data

US 2015/0058386 A1 Feb. 26, 2015

Related U.S. Application Data

(63) Continuation of application No. PCT/CN2014/072267, filed on Feb. 19, 2014.

(30) Foreign Application Priority Data

Aug. 26, 2013 (CN) .......................... 2013 1 0376605

(51) Int. Cl.
*G06F 7/00* (2006.01)
*G06F 17/30* (2006.01)

(52) U.S. Cl.
CPC .............................. *G06F 17/30233* (2013.01)

(58) Field of Classification Search
CPC .............................................. G06F 17/30233

USPC ......................................................... 707/831
See application file for complete search history.

(56) References Cited

U.S. PATENT DOCUMENTS

| 6,185,574 | B1 | 2/2001 | Howard et al. |
| 6,311,194 | B1 * | 10/2001 | Sheth ................ G06F 17/30595 |
| | | | 707/E17.095 |
| 2003/0110188 | A1 | 6/2003 | Howard et al. |
| 2005/0149496 | A1 | 7/2005 | Mukherjee et al. |
| 2005/0165754 | A1 | 7/2005 | Valliappan et al. |
| 2005/0246313 | A1 | 11/2005 | Turski et al. |
| 2006/0036568 | A1 | 2/2006 | Moore et al. |
| 2006/0235871 | A1 | 10/2006 | Trainor et al. |

(Continued)

FOREIGN PATENT DOCUMENTS

| CN | 1890748 | 1/2007 |
| CN | 101055752 | 10/2007 |

(Continued)

OTHER PUBLICATIONS

International Search Report of PCT/CN2014/072267, from the State Intellectual Property Office of China, dated May 28, 2014.

(Continued)

*Primary Examiner* — Van H Oberly
(74) *Attorney, Agent, or Firm* — Finnegan, Henderson, Farabow, Garrett & Dunner LLP

(57) ABSTRACT

A method for creating a virtual directory includes locating at least one file of a designated type by traversing a storage region, extracting attribute information of the at least one file, and creating a virtual directory according to the attribute information of the at least one file. The attribute information including at least two of a name, a play address, or episode information of the at least one file.

14 Claims, 9 Drawing Sheets

(56) References Cited

U.S. PATENT DOCUMENTS

| | | | | |
|---|---|---|---|---|
| 2006/0280435 | A1* | 12/2006 | Choi | G11B 27/105 386/327 |
| 2007/0107016 | A1* | 5/2007 | Angel | G06Q 30/06 725/61 |
| 2007/0168386 | A1 | 7/2007 | Choi et al. | |
| 2008/0071751 | A1* | 3/2008 | Keith, Jr. | G06F 17/30327 |
| 2008/0086491 | A1 | 4/2008 | Wang et al. | |
| 2008/0222547 | A1 | 9/2008 | Wong et al. | |
| 2008/0288531 | A1 | 11/2008 | Turski et al. | |
| 2008/0307346 | A1 | 12/2008 | Turski et al. | |
| 2009/0013252 | A1* | 1/2009 | DeWitt | G11B 27/034 715/716 |
| 2009/0055428 | A1 | 2/2009 | Turski et al. | |

FOREIGN PATENT DOCUMENTS

| | | |
|---|---|---|
| CN | 101124572 | 2/2008 |
| CN | 101211366 A | 7/2008 |
| CN | 102708197 A | 10/2012 |
| CN | 102722487 A | 10/2012 |
| CN | 103455583 | 12/2013 |
| JP | 2006-304146 A | 11/2006 |
| JP | 2011-159118 A | 8/2011 |
| KR | 10-2006-0126068 A | 12/2006 |
| RU | 2393554 C2 | 6/2010 |
| WO | WO 98/24025 | 6/1998 |

OTHER PUBLICATIONS

English translation of International Search Report of International Application No. PCT/CN2014/072267, dated May 28, 2014 (2 pages).

Extended European Search Report in European Application No. 14839899.3, issued by European Patent Office, dated Aug. 18, 2016 (8 pages).

Substantive Examination Inquiry dated Oct. 5, 2016 in counterpart Russian Application No. 2015125634/08(039908) and English translation thereof.

* cited by examiner

METHOD, ELECTRONIC DEVICE, AND STORAGE MEDIUM FOR CREATING VIRTUAL DIRECTORY

CROSS-REFERENCE TO RELATED APPLICATIONS

This application is a Continuation of International Application No. PCT/CN2014/072267, filed on Feb. 19, 2014, which is based upon and claims priority from Chinese Patent application No. 201310376605.6, filed on Aug. 26, 2013, the entire contents of both of which are incorporated herein by reference.

TECHNOLOGY FIELD

The disclosure relates a computer technology field and, more particularly, to a method, electronic device, and storage medium for creating a virtual directory.

BACKGROUND

An electronic device may be connected with one or more external devices, such as an external mobile hard disk, a network shared device, etc., and respective partitions inside the electronic device and the external device(s) may store many files.

When a user wants to view a file, such as a video file, the user needs to rely on his/her memory to determine in which partition of the electronic device or the external devices the video file is stored, and then locate the file in that partition of the external device or the electronic device.

However, since storage locations of files, such as video files, are not uniform and the user's memory may not be correct, the possibility of precisely locating the file in one try is relatively small, and the operation for finding the storage location of the file is also cumbersome.

SUMMARY

In accordance with the disclosure, there is provided a method for creating a virtual directory. The method includes locating at least one file of a designated type by traversing a storage region, extracting attribute information of the at least one file, and creating a virtual directory according to the attribute information of the at least one file. The attribute information includes at least two of a name, a play address, or episode information of the at least one file.

Also in accordance with the disclosure, there is provided an electronic device including a processor and a memory storing instructions. The instructions, when executed by the processor, cause the electronic device to locate at least one file of a designated type by traversing a storage region, extract attribute information of the at least one file, and create a virtual directory according to the attribute information of the at least one file. The attribute information includes at least two of a name, a play address, or episode information of the at least one file.

Also in accordance with the disclosure, there is provided a non-transitory computer-readable storage medium storing instructions. The instructions, when executed by a processor in an electronic device, cause the electronic device to locate at least one file of a designated type by traversing a storage region, extract attribute information of the at least one file, and create a virtual directory according to the attribute information of the at least one file. The attribute information includes at least two of a name, a play address, or episode information of the at least one file.

Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Embodiments consistent with the disclosure include a method, electronic device, and storage medium for creating a virtual directory.

Hereinafter, embodiments consistent with the disclosure will be described with reference to the drawings. Wherever possible, the same reference numbers will be used throughout the drawings to refer to the same or like parts.

Figure 1:
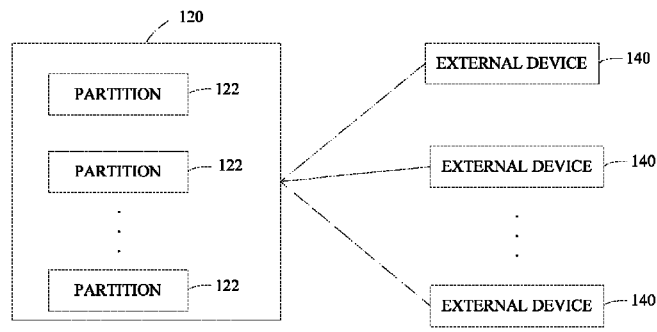
FIG. 1 is a diagram showing an environment related to a method for creating a virtual directory according to an embodiment.

FIG. 1 illustrates an implementation environment related to an exemplary method for creating a virtual directory consistent with embodiments of the disclosure. The implementation environment includes an electronic device 120 and at least one external device 140 connected to the electronic device 120.

The electronic device 120 includes, but is not limited to, a computer, a smart phone, a multimedia television, a Moving Pictures Experts Group-4 (MP4) player, etc. The electronic device 120 may include at least one partition 122 in which various types of files may be stored. For example, each partition 122 may be capable of storing video files, audio files, and/or document files, etc.

The external device 140 may be a portable hard drive, a USB flash drive, or a network shared device in the same local network as the electronic device 120. A player in the electronic device 120 may play a video file or an audio file in the external device 140.

Figure 2:
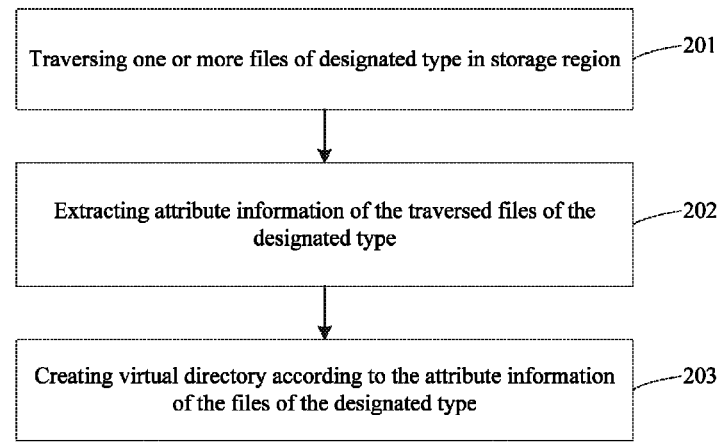
FIG. 2 is a flowchart showing a method for creating a virtual directory according to an embodiment.

FIG. 2 illustrates a flow of an exemplary method for creating a virtual directory consistent with embodiments of the disclosure. This method for creating a virtual directory may be implemented by the electronic device 120 in the implementation environment shown in FIG. 1.

As shown in FIG. 2, at 201, one or more files of a designated type are traversed in a storage region. A file of the designated type may include, for example, a video file, an audio file, or a document file.

Consistent with embodiments of the disclosure, the storage region may, by default, include all partitions in the electronic device and all of the external devices. Alternatively, the storage region may be designated by a user, and include, e.g., one or more of the partitions in the electronic device and/or one or more of the external devices. As one example, the storage region may, by default, include the partitions 122 in the electronic device 120 shown in FIG. 1 and a storage region in the external device 140 externally connected to the electronic device 120. As another example, one or more partitions 122 in the electronic device 120 and/or one or more external devices 140 may be selected as the storage region by a user as desired. For example, when a user wants to view a video file stored on a designated external device 140, the user may set the designated external device 140 as the storage region. Thus, only the designated external device 140 needs to be traversed to retrieve the video file.

In some embodiments, if the storage region includes a plurality of external devices and a plurality of partitions of the electronic device, or at least one external device and at least one partition of the electronic device, the files of the designated type in the storage region may be traversed according to a predetermined traversal path. For example, when the storage region includes a first external device and a second external device, the predetermined traversal path may be set as "first external device→second external device." In this case, the files of the designated type in the first external device are traversed, and then the files of the designated type in the second external device are traversed. For another example, if the storage region includes a partition D and a partition E in an electronic device, and a first external device and a second external device, the predetermined traversal path may be set as "partition D in electronic device→partition E in electronic device→first external device→second external device." In this case, the partition D in the electronic device is first traversed, then the partition E is traversed, subsequently the first external device is traversed, and finally the second external device is traversed.

At 202, attribute information of the traversed files of the designated type is extracted. In some embodiments, the attribute information includes at least name and play addresses of the files of the designated type. In some embodiments, the attribute information also includes episode information.

If the files of the designated type include video files, the attribute information of the files of the designated type may include the name and the play addresses of the files of the designated type. Alternatively, the attribute information may include the name, the play addresses, and the episode information of the files of the designated type, etc.

For example, if a video file is a movie, the attribute information of the video file may include the name and the play address of the movie. For another example, if a video file is a certain episode of a TV show, the attribute information of the video file may include the name of the TV show, the play address of the video file, and the episode information indicating which episode of the TV show the video file is.

It is noted that the play address mentioned above refers to a storage path of the video file in the partitions of the electronic device 120 or in the external device 140.

At 203, a virtual directory is created according to the attribute information of the files of the designated type.

In some embodiments, a user may create a virtual directory for the files of the designated type as desired. For example, the user may create a virtual directory for video files, may create a virtual directory for audio files, and may also create a virtual directory for document files. The user may also create a virtual directory for other type of files.

In some embodiments, creating a virtual directory according to the attribute information of the files of the designated type may include grouping the attribute information with the same name into one class. If the class includes only one piece of attribute information, the attribute information is set as a node in a first-level directory of the virtual directory. The node includes the name and play addresses of the files of the designated type corresponding to the attribute information.

If the class includes at least two pieces of attribute information and the attribute information includes the episode information, a node in the first-level directory is generated for the class. The node includes at least name of the files of the designated type corresponding to the attribute information in the class. Then the respective pieces of attribute information in the class are set as sub-nodes in a second-level directory of the virtual directory under the node in the first-level directory, respectively. The sub-nodes include name, play addresses, and episode information of the files of the designated type corresponding to the attribute information.

In some embodiments, generating a node in the first-level directory for the class includes creating a node corresponding to the class in the first-level directory, setting a name in the attribute information in the class as a name of the node in the first-level directory, setting the number of pieces of attribute information in the class as total-episode-number information of the node in the first-level directory, and setting the name and the total-episode-number information as contents included in the node.

In some embodiments, the methods according to the disclosure may further include creating an electronic card for the node in the first-level directory according to the attribute information corresponding to the node, and displaying the electronic card corresponding to the node in the first-level directory in a designated display area.

In some embodiments, displaying the electronic card corresponding to the node in the first-level directory in the designated display area may include acquiring poster information of the files of the designated type corresponding to the node in the first-level directory, adding the poster information to the electronic card corresponding to the node, and displaying the electronic card having the poster information and corresponding to the node in the designated display area. In some embodiments, the poster information is a picture indicating contents of the files of the designated type.

In some embodiments, the node in the first-level directory further includes a category of the files of the designated type corresponding to the attribute information corresponding to the node. In such embodiments, the method consistent with the disclosure further includes acquiring a displaying request containing a designated category. Further, creating the electronic card for the node according to the attribute information corresponding to the node in the first-level directory includes selecting, in the first-level directory, a node corresponding to the attribute information containing the designated category, and creating the electronic card for the selected node according to the attribute information corresponding to the selected node. Similarly, displaying the electronic card corresponding to the node in the first-level directory in the designated display area includes displaying an electronic card corresponding to the selected node in the designated display area.

In some embodiments, the attribute information further includes a category of the files of the designated type. In such embodiments, the method consistent with the disclosure further includes acquiring a displaying request containing a designated category, and deleting an electronic card already displayed in the designated display area and corresponding to a category different from the designated category.

In some embodiments, the method according to the disclosure may further include receiving a playing request. The playing request is generated when a user selects an electronic card in the designated display area and includes attribute information corresponding to the electronic card. If the attribute information in the playing request contains a play address, then the play address in the attribute information corresponding to the electronic card is sent to a player, so that the player can play files of the designated type corresponding to the electronic card according to the play address in the attribute information. On the other hand, if the attribute information in the playing request does not contain a play address, play addresses in attribute information of all sub-nodes of the node corresponding to the electronic card are sent to a player, so that the player can play files of the designated type corresponding to the sub-nodes according to the play addresses in the attribute information of the sub-nodes.

As described above, methods consistent with the disclosure solve problems in the conventional technologies by acquiring all the files of a designated type in a designated storage region and creating a virtual directory according to attribute information of the acquired files of the designated type. In addition, since all files of the same designated type in respective partitions of an electronic device and external devices are placed uniformly in a virtual directory, the desired files of the designated type can be directly located in the virtual directory, thereby realizing quick locating of the desired files of the designated type.

Figure 3:
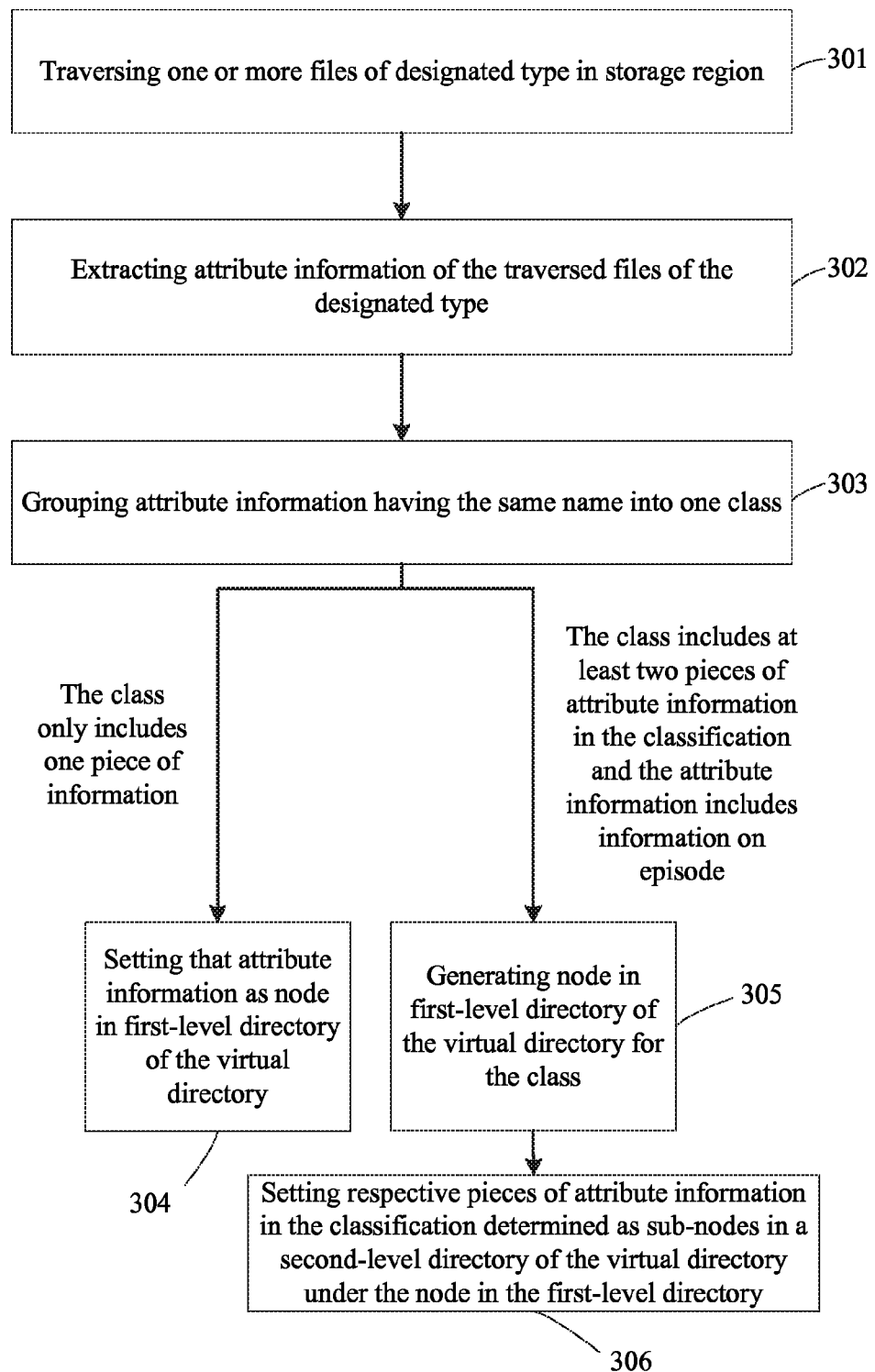
FIG. 3 is a flowchart showing a method for creating a virtual directory according to an embodiment.

FIG. 3 illustrates a flow of another exemplary method for creating a virtual directory consistent with embodiments of the disclosure. This method for creating a virtual directory may be implemented by the electronic device 120 in the implementation environment shown in FIG. 1.

As shown in FIG. 3, at 301, one or more files of a designated type are traversed in a storage region. A file of the designated type may include, for example, a video file, an audio file, or a document file.

Consistent with embodiments of the disclosure, the storage region may, by default, include all partitions in the electronic device and all of the external devices. Alternatively, the storage region may be designated by a user, and include, e.g., one or more of the partitions in the electronic device and/or one or more of the external devices. As one example, the storage region may, by default, include the partitions 122 in the electronic device 120 shown in FIG. 1 and a storage region in the external device 140 externally connected to the electronic device 120. As another example, one or more partitions 122 in the electronic device 120 and/or one or more external devices 140 may be selected as the storage region by a user as desired.

In some embodiments, if the storage region includes a plurality of external devices and a plurality of partitions of the electronic device, or at least one external device and at least one partition of the electronic device, the files of the designated type in the storage region may be traversed according to a predetermined traversal path. For example, when the storage region includes a first external device and a second external device, the predetermined traversal path may be set as "first external device→second external device." In this case, the files of the designated type in the first external device are traversed, and then the files of the designated type in the second external device are traversed.

At 302, attribute information of the traversed files of the designated type is extracted. In some embodiments, the attribute information includes at least name and play addresses of the files of the designated type. In some embodiments, the attribute information also includes episode information.

Consistent with embodiments of the disclosure, the attribute information of the files of the designated type may be different files of different designated types. Thus, the attribute information of the files of the designated type can be determined based on the designated type. For example, attribute information of a text file may include at least one of a name, a size, or a creating time, etc., of the file. For another example, attribute information of an audio file may include at least one of a format or a name, etc., of the audio file.

Taking video files as an example of the files of the designated type, the attribute information of the files of the designated type may include the name and the play addresses of the files of the designated type. Alternatively, the attribute information may include the name, the play addresses, and the episode information of the files of the designated type, etc.

For example, if a video file is a movie, the attribute information of the video file may include the name and the play address of the movie. For another example, if a video file is a certain episode of a TV show, the attribute information of the video file may include the name of the TV show, the play address of the video file, and the episode information indicating which episode of the TV show the video file is.

It is noted that the play address mentioned above refers to a storage path of the video file in the partitions of the electronic device 120 or in the external device 140.

After the attribute information of the files of the designated type is acquired, a virtual directory related to these designated types can be created according to the attribute information of the files of the designated type, as described in greater detail below with reference to 303 to 306.

At 303, the attribute information with the same name is grouped into one class. That is, after the attribute information of all of the files of the designated type is acquired, all of the attribute information may be classified according to the name in the attribute information, i.e., the attribute information with the same name is grouped into one class.

For example, if the name in attribute information 1 is "Strive" and the name in attribute information 2 is also "Strive", then the attribute information 1 and the attribute information 2 can be grouped into one class.

If the name in one piece of attribute information is different from the names in other pieces of attribute information, that one piece of attribute information can be classified into one class, i.e., such a class only contains a single piece of attribute information.

For example, when a plurality of video files of the same TV show are acquired through the traversal (the scenario in which the TV show includes a plurality of episode video files), the names of the plurality of video files are all the name of the TV show. In this situation, the plurality of the video files can be grouped into one class. For another example, when a plurality of video files of the same movie are acquired through the traversal (the scenario in which the movie includes a plurality of segment video files), the names of these video files are all the name of the movie. In this situation, the video files can be grouped into one class.

At 304, if a class only includes one piece of attribute information, then that attribute information is set as a node in a first-level directory of the virtual directory. The node includes a name and a play address of the files of the designated type corresponding to the attribute information.

The group only including one piece of attribute information indicates that there is no other attribute information that has the same name as that of the attribute information in the group, and the files of the designated type (that is a video file) corresponding to the attribute information may be determined as a movie having a single video or one individual episode of a teleplay. In this case, the attribute information can be set as the node in the first-level directory in the virtual directory. Correspondingly, the node includes the name and the play address of the files of the designated type corresponding to the attribute information.

In other word, when the attribute information is directly set as the node in the first-level directory of the virtual directory, the node corresponds to a movie having a single video or one individual episode of a TV show. In this case, the node may include the name and the play address of the corresponding video file (a movie having a single video or one individual episode of a TV show).

At 305, if there are at least two pieces of attribute information in the class and the attribute information includes episode information, a node in the first-level directory is generated for the class. The node includes at least a name of the files of the designated type corresponding to the attribute information in the classification.

If a file of the designated type is a one segment video file of a movie, the episode information in the attribute information of the file of the designated type may refer to the segment of the movie to which the file of the designated type corresponds. If a file of the designated type is a one episode video file of a TV show, the episode information in the attribute information of the file of the designated type may refer to the episode of the TV show to which the file of the designated type corresponds.

If there are at least two pieces of attribute information in the class and the attribute information includes episode information that is used to indicate which episode of a TV show to which the file of the designated type corresponds or which segment of a movie to which the file of the designated type corresponds, then these pieces of attribute information are the attribute information of multiple segment video files of the same movie or the attribute information of multiple episode video files of the same TV show. In this case, a node can be generated in the first-level directory of the virtual directory for these pieces of attribute information, and the node may include at least a name of the files of the designated type corresponding to these pieces of attribute information.

In some embodiments, the procedure for generating a node in the first-level directory for the class includes creating a node corresponding to the class in the first-level directory, setting a name in the attribute information in the class as a name of the node in the first-level directory, setting the number of pieces of attribute information in the class as total-episode-number information of the node in the first-level directory, and setting the name and the total-episode-number information as contents included in the node.

That is, when a node is created in a first-level directory for a class, the node can include a name and total-episode-number information. The name is a name in the attribute information in the class, and the total-episode-number information indicates the number of pieces of attribute information in the class. For example, if there are twenty video files that have the same name, then the twenty video files generally correspond to the same TV show. In this case, a node representing this TV show can be generated for these twenty video files in the first-level directory. The node includes a name and total-episode-number information (20 episodes in total) of the TV show.

At 306, individual pieces of attribute information in the class are respectively set as sub-nodes in a second-level directory of the virtual directory under the node in the first-level directory. Each sub-node includes the name, play addresses, and episode information of the files of the designated type corresponding to the attribute information.

That is, after a node is generated in the first-level directory for a plurality of pieces of attribute information in the same class, these pieces of attribute information need to be added under the node to serve as sub-nodes of the node, i.e., the respective pieces of attribute information in the class are set as sub-nodes in the second-level directory of the virtual directory under the node in the first-level directory. Correspondingly, each sub-node may include the name, play addresses, and episode information of the files of the designated type corresponding to the attribute information.

For example, when a TV show contains multiple episode video files, the attribute information of each of the episode video files includes a name, a play address, and episode information of the TV show. In this case, a node including the name and total-episode-number information of the TV show can be generated in a first-level directory for the TV show. Then, sub-nodes are generated in a second-level directory under the node for these episode video files, and the sub-nodes may include the name of the TV show, the play address of each episode video file, and the episode information indicating the episode to which each episode video file corresponds. For another example, when a movie includes multiple segment video files, the attribute information of each of the segment video files includes a name, a play address, and episode information of the movie. In this case, a node including the name and total-episode-number information of the movie can be generated in a first-level directory for the movie. Then, sub-nodes are generated in a second-level directory under the node for these segment video files, and the sub-nodes may include the name of the movie, the play addresses of each segment video file, and the episode information indicating the segment to which each segment video file corresponds. For yet another example, when a video file is a movie having a single video file, a node that includes a name and a play address of the movie can be created in a first-level directory for the movie. For still another example, when there is only one individual video file of a TV show (such as when there is only one individual video file of a TV show type in the traversed storage region, and the video file has a name different from that of other video files), a node can be created in a first-level directory for the video file. The node may include a name, a play address, and episode information of the video file.

Figure 4:
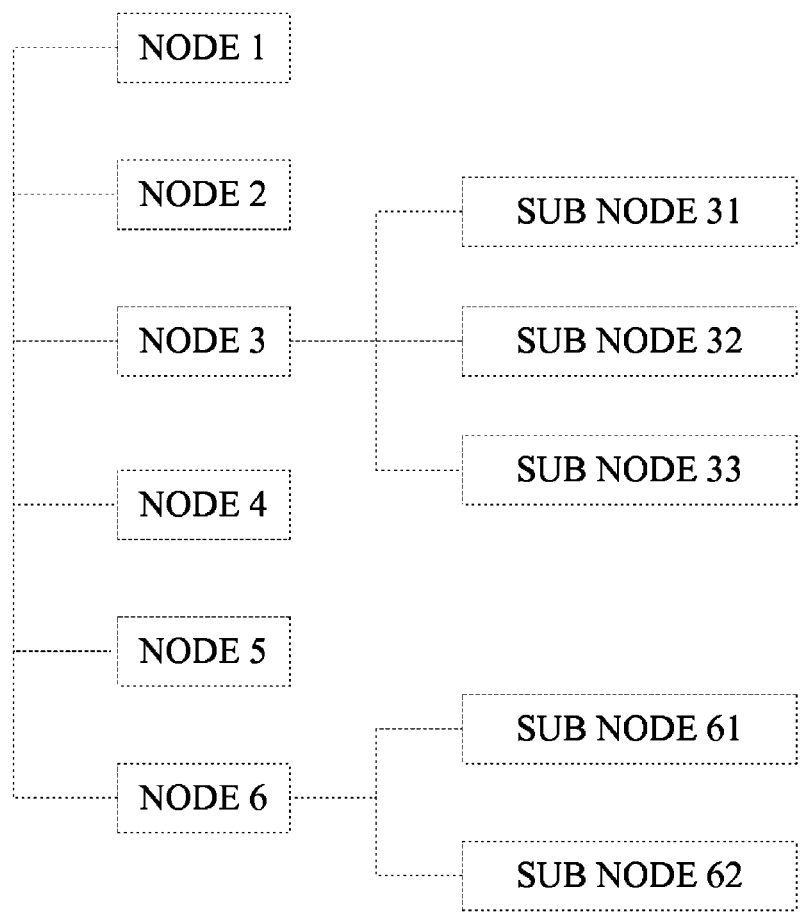
FIG. 4 is a schematic diagram showing an arrangement of a virtual directory according to an embodiment.

FIG. 4 illustrates an exemplary structure of a virtual directory consistent with embodiments of the disclosure. The virtual directory shown in FIG. 4 contains a first-level directory and a second-level directory. The first-level directory may include one or more nodes related to single-video files of a movie type, one or more nodes related to movie collections, one or more nodes related to TV show collections, or one or more nodes related to individual video files of a TV show type. For a node related to a movie collection in the first-level directory, the corresponding second-level directory includes sub-nodes related to segment video files of the movie collection. For a node related to a TV show collection in the first-level directory, the corresponding second-level directory includes sub-nodes related to episode video files of the TV show collection. For example, in FIG. 4, a second-level directory under node 3 contains a sub-node 31, a sub-node 32, and a sub-node 33. If the node 3 is a node related to a TV show collection, then the sub-node 31, the sub-node 32, and the sub-node 33 correspond to three episode video files of the TV show under the node 3, respectively. For another example, in FIG. 4, a second-level directory under node 6 contains a sub-node 61 and a sub-node 62. If the node 6 is a node related to a movie collection, then the sub-node 61 and the sub-node 62 correspond to a first movie segment and a second movie segment under the node 6, respectively.

In some embodiments, nodes in the first-level directory of the virtual directory may be arranged randomly or arranged according to a predetermined rule. For example, the nodes may be arranged in a counter chronological manner according to time corresponding to each node. Alternatively, nodes corresponding to movies may be arranged before nodes corresponding to TV shows. The order of electronic cards in the first-level directory is not restricted.

It should be noted that, if the attribute information of any of the traversed video files does not share a same name with the attribute information of another one of the traversed video files, then the traversed video files only contain movies and/or single-episode TV shows. In this case, the created virtual directory only contains a first-level directory. In addition, after all of the video files in the storage region are traversed, the virtual directory created according to these video files is unique. If the storage region includes one or more external devices, the created virtual directory would not change as long as the one or more external devices are connected. If the storage region is changed, the files of the designated type in the storage region need to be traversed again, and a new virtual directory is created according to the newly acquired files of the designated type through the latest traversal.

As described above, methods consistent with the disclosure overcome problems in conventional technologies by acquiring all the files of a designated type in a designated storage region and creating a virtual directory, including a first-level directory and a second-level directory, according to attribute information of the acquired files of the designated type. In addition, since all files of the same designated type in respective partitions of an electronic device and external devices are placed uniformly in a virtual directory, the desired files of the designated type can be directly located in the virtual directory, thereby realizing quick locating of the desired files of the designated type.

Figure 5:
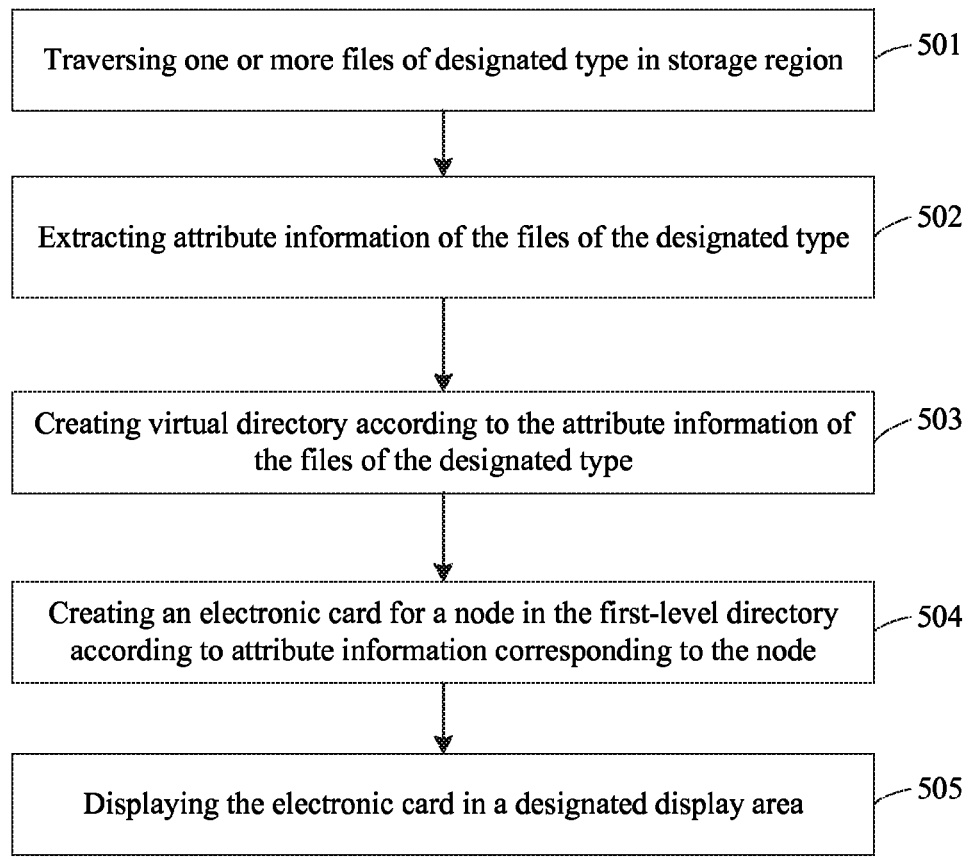
FIG. 5 is a flowchart showing a method for creating a virtual directory according to an embodiment.

Generally, in order to help a user find a desired video file in the virtual directory, the virtual directory is displayed. FIG. 5 illustrates a flow of an exemplary method for creating a virtual directory consistent with embodiments of the disclosure. The method for creating a virtual directory may be implemented by the electronic device 120 in the implementation environment shown in FIG. 1.

As shown in FIG. 5, at 501, one or more files of a designated type are traversed in a storage region. A file of the designated type may include a video file, an audio file, or a document file.

Consistent with embodiments of the disclosure, the storage region may, by default, include all partitions in the electronic device and all of the external devices. Alternatively, the storage region may be designated by a user, and include, e.g., one or more of the partitions in the electronic device and/or one or more of the external devices.

In some embodiments, if the storage region includes a plurality of external devices and a plurality of partitions of the electronic device, or at least one external device and at least one partition of the electronic device, the files of the designated type in the storage region may be traversed according to a predetermined traversal path. For example, when the storage region includes a first external device and a second external device, the predetermined traversal path may be set as "first external device→second external device." In this case, the files of the designated type in the first external device are traversed, and then the files of the designated type in the second external device are traversed.

At 502, attribute information of the traversed files of the designated type is extracted. In some embodiments, the attribute information includes at least name and play addresses of the files of the designated type. In some embodiments, the attribute information also includes episode information.

Consistent with embodiments of the disclosure, the attribute information of the files of the designated type may be different files of different designated types. Thus, the attribute information of the files of the designated type can be determined based on the designated type. For example, attribute information of a text file may include at least one of a name, a size, or a creating time, etc., of the file. For another example, attribute information of an audio file may include at least one of a format or a name, etc., of the audio file.

Taking video files as an example of the files of the designated type, the attribute information of the files of the designated type may include the name and the play addresses of the files of the designated type. Alternatively, the attribute information may include the name, the play addresses, and the episode information of the files of the designated type, etc.

For example, if a video file is a movie, the attribute information of the video file may include the name and the play address of the movie. For another example, if a video file is a certain episode of a TV show, the attribute information of the video file may include the name of the TV show, the play address of the video file, and the episode information indicating which episode of the TV show the video file is.

It is noted that the play address mentioned above refers to a storage path of the video file in the partitions of the electronic device 120 or in the external device 140.

At 503, a virtual directory is created according to the attribute information of the files of the designated type.

In some embodiments, creating a virtual directory according to the attribute information of the files of the designated type may include grouping the attribute information with the same name into one class. If the class includes only one piece of attribute information, the attribute information is set as a node in a first-level directory of the virtual directory. The node includes the name and play addresses of the files of the designated type corresponding to the attribute information. If the class includes at least two pieces of attribute information and the attribute information includes the episode information, a node in the first-level directory is generated for the class. The node includes at least a name of the files of the designated type corresponding to the attribute information in the class. Then the respective pieces of attribute information in the class are set as sub-nodes in a second-level directory of the virtual directory under the node in the first-level directory, respectively. The sub-nodes include name, play addresses, and episode information of the files of the designated type corresponding to the attribute information.

At 504, an electronic card is created for a node in the first-level directory according to the attribute information corresponding to the node. The electronic card is a card displayed in a display area for viewing or selecting by a user. Generally, the electronic card can display a name of a video file or a name and episode information of a video file. Further, the electronic card generally corresponds to a play address of the corresponding video file.

A node in a first-level directory may be one of various types. For example, a node may be related to a single-video file of a movie type. The attribute information of such a node includes a name and a play address of the movie. In this case, the electronic card created for this node includes a name, a play address, and episode information (indicating, e.g., which segment). A node may also be related to a movie collection, which includes a name of the movie and total-episode-number information. In this case, the electronic card created for this node includes the name of the movie collection and the total-episode-number information. A node may also be related to a TV show collection, which includes a name of the TV show and total-episode-number information. In this case, the electronic card created for this node includes the name of the TV show collection and the total-episode-number information. A node may also be related to an individual video file of a TV show type, the attribute information of which includes a name of the TV show, a play address of the individual video file, and episode information (indicating, e.g., which episode). In this case, the electronic card created for this node includes the name of the TV show and the play address of the individual file.

In order to allow a user to more easily determine whether a video file is a movie or an episode of a TV show, total-episode-number information can be provided in the electronic cards related to a TV show collection or a movie collection. As a result, a user may preliminarily determine whether an electronic card corresponds to a movie or a TV show, according to the total-episode-number information displayed in the electronic card. For example, if no total-episode-number information or episode information is displayed in an electronic card, it may be preliminarily determined that the electronic card corresponds to a movie. For another example, if total-episode-number information is displayed in an electronic card and the value of the total-episode number information is larger than a predetermined threshold (for example, 10, since the total number of episode of a TV show is usually relatively large), it may be preliminarily determined that the electronic card corresponds to a TV show. For yet another example, if total-episode-number information is displayed in an electronic card and the value of the total-episode-number information is smaller than a predetermined threshold (for example, 10, since the total number of segments of a movie is usually relatively small), it may be preliminarily determined that the electronic card corresponds to a movie. For still another example, if episode information is displayed in an electronic card, it may be preliminarily determined that the electronic card corresponds to an individual episode of a TV show or a segment of a movie.

At 505, electronic cards corresponding to the nodes in the first-level directory are displayed in a designated display area. The designated display area may be a display area for displaying the virtual directory in the electronic device 120. The display area can be used to display electronic cards in the first-level directory of the virtual directory.

In some embodiments, electronic cards may also be created for sub-nodes in the second-level directory according to the attribute information corresponding to the sub-nodes. In this case, with the first-level directory displayed, when the user clicks an electronic card in the first-level directory that has sub-nodes, electronic cards of the sub-nodes in the second-level directory are displayed.

In some embodiments, in order to help the user to learn the contents of a video file corresponding to an electronic card, poster information indicating the contents of the corresponding video file can be provided for the electronic card when it is created. That is, displaying, in the designated display area, electronic cards corresponding to nodes in the first-level directory may include further details as described below.

First, poster information of a file of a designated type corresponding to a node in a first-level directory of a virtual directory is acquired. The poster information includes a picture indicating contents of the file of the designated type.

The file of the designated type corresponding to an electronic card in the first-level directory of the virtual directory may be a movie file or a TV show file. Usually, a multimedia producer may design poster information for a file of a designated type (such as a movie file or a TV show file), which is used for presenting contents of the file of the designated type (such as a movie file or a TV show file).

In some embodiments, when an electronic device creates an electronic card for a file of a designated type, the electronic device can retrieve corresponding poster information from a server. If the server does not contain the corresponding poster information, a frame of image can be extracted from video data in the file of the designated type, and used as the poster information of the file of the designated type.

If the server does not contain the corresponding poster information on the file of the designated type and the frame of image of the file of the designated type is not acquired due to some reasons, the poster information of the file of the designated type can be set to an image representing that there is no official poster information for the file of the designated type.

For example, if the node in the first-level directory corresponds to a movie, poster information for the movie is retrieved. If the node in the first-level directory corresponds to a TV show, poster information for the TV show is retrieved. In some embodiments, the poster information corresponding to the movie or the TV show can be retrieved from a server releasing the movie or the TV show. Further, when an electronic card needs to be created for a sub-node in the second-level directory, a frame of image extracted from a video file corresponding to the sub-node can be used as poster information for the sub-node.

Second, the poster information is added to the electronic card corresponding to the node.

Generally, in order to allow a user to preliminarily find a desired video file, the name of the video file may be added to a corresponding electronic card, so that the user may find and confirm the video file according to the name on the electronic card. However, it is slower to find a video file by viewing names on electronic cards one by one and it is less intuitive than poster information. Adding the acquired poster information to the electronic card allows the user to find the desired video file more quickly.

Third, the electronic card with the poster information and corresponding to the node is displayed in the designated display area.

Figure 6:
FIG. 6 is a diagram showing a virtual directory according to an embodiment.

FIG. 6 illustrates a diagram of an exemplary virtual directory consistent with embodiments of the disclosure. After poster information is added to an electronic card in the first-level directory, the electronic card having the added poster information can be displayed in a designated display area. In FIG. 6, a plurality of electronic cards having poster information are displayed in sequence. Each electronic card displays the poster information. The name of the video file corresponding to the node is displayed under the poster information or at another location. In FIG. 6, official poster information is not retrieved for the last electronic card, and therefore an image indicating that there is no official poster information for the file of the designated type is displayed as the poster information.

Figure 7:
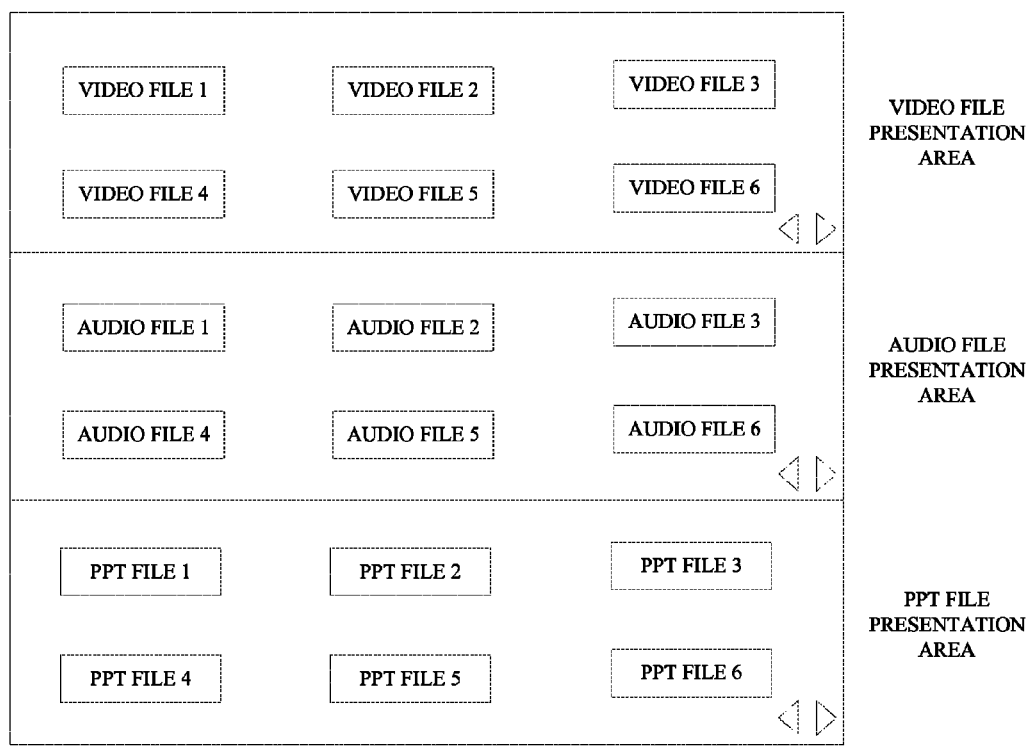
FIG. 7 is a diagram showing a display area according to an embodiment.

In some embodiments, the user can create a virtual directory for files of a designated type as desired. For example, the user can create a virtual directory for video files, a virtual directory for audio files, a virtual directory for document files, or a virtual directory for files of another type. Therefore, when two or more virtual directories are created, different virtual directories can be respectively displayed in different locations of a display area, i.e. different virtual directories are respectively displayed in different designated display areas. That is, the designated display area can be a part of the display area used for displaying the virtual directories. FIG. 7 illustrates a diagram of an exemplary display area consistent with embodiments of the disclosure. For example, the virtual directory of video files is displayed in one designated display area (video file presentation area) of the display area. The virtual directory of audio files is displayed in another designated display area (audio file presentation area) of the display area. The virtual directory of PPT format files is displayed in a still other designated display area (PPT file presentation area) of the display area. Since each designated display area may be limited by the size of the electronic device, when there are a relatively large number of electronic cards in a designated display area, page turning buttons, such as a page-up button and a page-down button, can be provided in the designated display area. If the electronic device is a touch screen device, the user can also turn the pages by touching the screen. In some embodiments, when the user only wishes to view contents in one of the presentation areas, contents in other presentation areas can be temporarily hidden. On the other hand, when the user wishes to view contents in one of the hidden presentation areas, the contents in the hidden presentation area can be displayed.

It should be noted that, after the video files in the storage region are traversed, the virtual directory created according to these video files is unique. If the storage region includes one or more external devices, the created virtual directory would not change as long as the one or more external devices are connected. If the storage region is changed, the files of the designated type in the storage region need to be traversed again, and a new virtual directory is created according to the newly acquired files of the designated type through the latest traversal.

In some embodiments, when electronic cards are displayed, in order to prevent too many electronic cards from being displayed, the user can select to display only electronic cards of a designated category as desired. For example, the user can select to display only movies or only TV shows. Correspondingly, the electronic device may obtain a displaying request containing a designated category selected by the user, such as "movies" or "TV shows". In these embodiments, 504 in FIG. 5 as described above may include selecting a node in the first-level directory that has attribute information containing the designated category, and creating an electronic card for the selected node according to the attribute information corresponding to the selected node. That is, the electronic card is only created for the node in the first-level directory that has the designated category in the first-level directory. for example, the electronic card is only created for a node in the first-level directory that is related to movies, or for a node in the first-level directory that is related to TV shows. Correspondingly, 505 in FIG. 5 as described above may include displaying the electronic card corresponding to the selected node in the designated display area. Accordingly, when the user selects to display only electronic cards of a designated category, electronic cards may be created only for nodes in the first-level directory that have the designated category, and the created electronic cards are then displayed. In some embodiments, the designated category of the files of the designated type can be retrieved from a server.

In some embodiments, the user did not select to only display electronic cards with the designated category when he/she first chose to display electronic cards in the first-level directory. When the user realizes there are too many electronic cards displayed but he/she now only wishes to watch movies, the user can select to display only the electronic cards related to movies. However, since the electronic device has already created electronic cards for all of the movies and TV shows in the first-level directory, there is no need to re-create electronic cards for the movies. The user only needs to delete displayed electronic cards related to the TV shows. Thus, when the user requests to display electronic cards of a designated category, the electronic device 120 receives a displaying request containing the designated category, and deletes electronic cards displayed in the designated display area whose attribute information does not contain the designated category. In some embodiments, in order to better display the remaining electronic cards that are related to the designated category, the vacant locations previously occupied by the deleted electronic cards can be removed from the designated display area. Only the electronic cards related to the designated category are retained in the designated display area.

As described above, methods consistent with the disclosure overcome problems in conventional technologies by acquiring all the files of a designated type in a designated storage region and creating a virtual directory, including a first-level directory and a second-level directory, according to attribute information of the acquired files of the designated type, providing corresponding poster information for electronic cards of the first-level directory, and displaying the electronic cards of the first-level directory that contain the poster information in a designated display area. In addition, since all files of the same designated type in respective partitions of an electronic device and external devices are placed uniformly in a virtual directory, the desired files of the designated type can be directly located in the virtual directory. Further, by adding poster information to electronic cards that need to be displayed, the user can more intuitively locate the electronic card that he/she needs. As a result, quick locating of the desired files of the designated type is realized.

Figure 8:
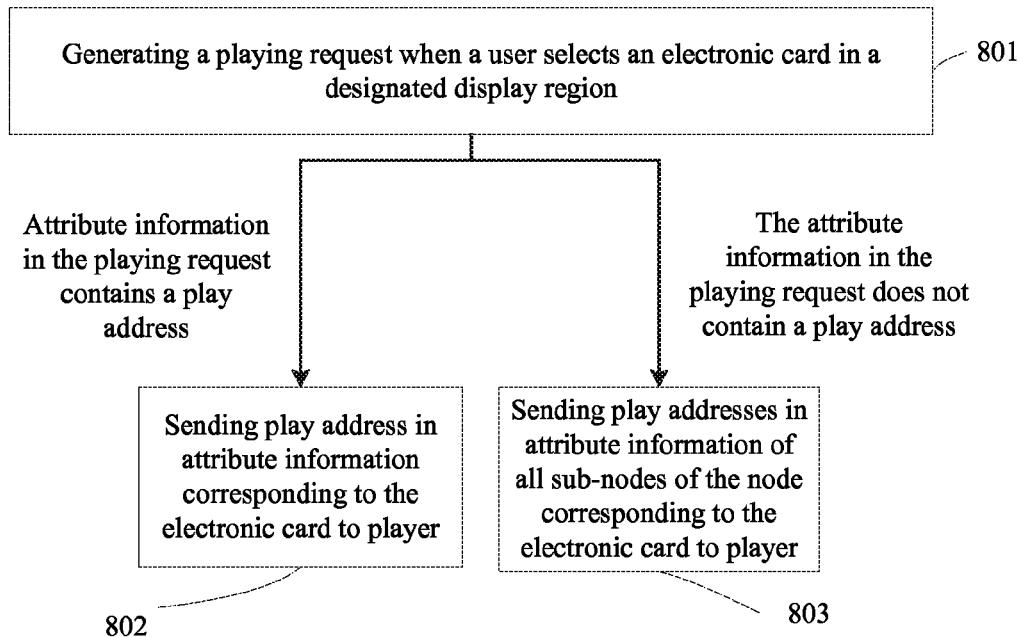
FIG. 8 is a diagram showing a flow of playing an electronic card on demand in a virtual directory according to an embodiment.

In some embodiments, after the created first-level directory of the virtual directory is displayed in a designated display area, if the user wishes to play a video file corresponding to an electronic card in the virtual directory, the user may select the electronic card to be played in the first-level directory of the virtual directory. FIG. 8 shows a flowchart of an exemplary method for playing an electronic card in a virtual directory on demand, consistent with embodiments of the disclosure.

As shown in FIG. 8, at 801, a playing request generated when a user selects an electronic card in a designated display area is received. The playing request includes attribute information corresponding to the electronic card. Specifically, the user can select to play a movie or a TV show in a first-level directory according to the displayed first-level directory. When the user selects the electronic card in the first-level directory, the electronic device 120 receives a playing request for playing a video file corresponding to the electronic card.

At 802, if the attribute information in the playing request contains a play address, the play address in the attribute information corresponding to the electronic card is sent to a player, so that the player plays a file of the designated type corresponding to the electronic card according to the play address in the attribute information.

Specifically, if the attribute information in the playing request contains the play address, this indicates that the electronic card selected by the user corresponds to an individual video file of a movie type or an individual video file of a TV show type. In this case, the attribute information of the video file can be directly sent to the player, so that the player plays the corresponding video file according to the play address in the attribute information. Generally, if the attribute information in the playing request contains the play address, the play address in the attribute information corresponding to the electronic card is sent to the player. Alternatively, the play address and a name in the attribute information corresponding to the electronic card (i.e., a case in which the electronic card corresponds to an individual video file of a movie type), or the play address, the name, and episode information on in the attribute information (i.e., a case in which the electronic card corresponds to an individual video file of a TV show type), can be sent to the player. The player then plays the corresponding video file according to the play address, and displays the name of the video file, or the name and episode information of the video file, while playing.

At 803, if the attribute information in the playing request does not contain a play address, play addresses in attribute information of all of the sub-nodes of the node corresponding to the electronic card are sent to the player. The player then plays, according to the play addresses in the attribute information of the sub-nodes, files of the designated type corresponding to the sub-nodes.

Specifically, if the attribute information in the playing request does not contain a play address, this indicates that the electronic card selected by the user corresponds to a TV show having multiple episodes or a movie having multiple segments. Generally, such an electronic card would contain a second-level directory. In this case, play addresses in attribute information of sub-nodes under the node corresponding to the selected electronic card are sent to the player. The player then plays corresponding files according to the play addresses in the attribute information of the sub-nodes. Generally, if the attribute information in the playing request does not contain a play address, play addresses in attribute information of the sub-nodes under the node corresponding to the electronic card are sent to the player. Alternatively, the play addresses, name, and episode information in the attribute information of the sub-nodes under the node corresponding to the electronic card are sent to the player. The player then plays the corresponding video files according to the play addresses and display the name and the episode information of the video files while playing.

When the player receives a set of play address and name, the name can be directly displayed at a designated location on the player, and a corresponding video file can be played according to the play address. When the player receives multiples sets of play address, name, and episode information, the play addresses and names can be stored in a playing list in an order according to the episode information, and the corresponding video files can be played according to the playing list while the name and episode information, corresponding to the play address of the video file currently being played, are displayed.

Generally, if, after receiving a set of play address and name, the player finds that the play address is the same as that of a recently played video file, the player continues to play the video file from a previously paused position. If, after receiving multiple sets of play address and name, the player finds that the play address in one of the sets is the same as that of a recently played video file, the player continues to play the video file corresponding to that play address from a previously paused position.

Below, an apparatus for creating a virtual directory is described with reference to FIGS. 9 and 10.

Figure 9:
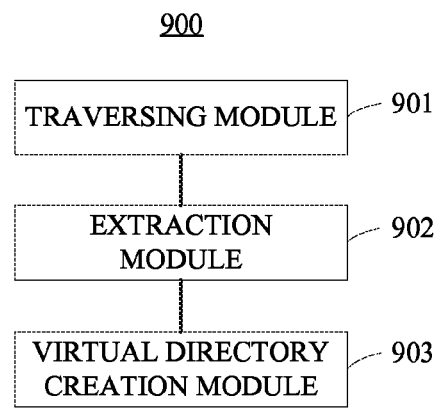
FIG. 9 is a block diagram showing an apparatus for creating a virtual directory according to an embodiment.

FIG. 9 illustrates a block diagram of an exemplary apparatus 900 for creating a virtual directory consistent with embodiments of the disclosure. The apparatus 900 includes, but is not limited to, a traversing module 901, an extraction module 902, and a virtual directory creation module 903.

The traversing module 901 is configured to traverse files of a designated type in a storage region.

The extraction module 902 is configured to extract attribute information of the files of the designated type traversed by the traversing module 901. In some embodiments, the attribute information includes at least name and play addresses of the files of the designated type. In some embodiments, the attribute information also includes episode information.

The virtual directory creation module 903 is configured to create a virtual directory according to the attribute information of the files of the designated type extracted by the extraction module 902.

As described above, apparatuses consistent with the disclosure overcome problems in conventional technologies by acquiring all the files of a designated type in a designated storage region and creating a virtual directory according to attribute information of the acquired files of the designated type. In addition, since all files of the same designated type in respective partitions of an electronic device and external devices are placed uniformly in a virtual directory, the desired files of the designated type can be directly located in the virtual directory, thereby realizing quick locating of the desired files of the designated type.

Figure 10:
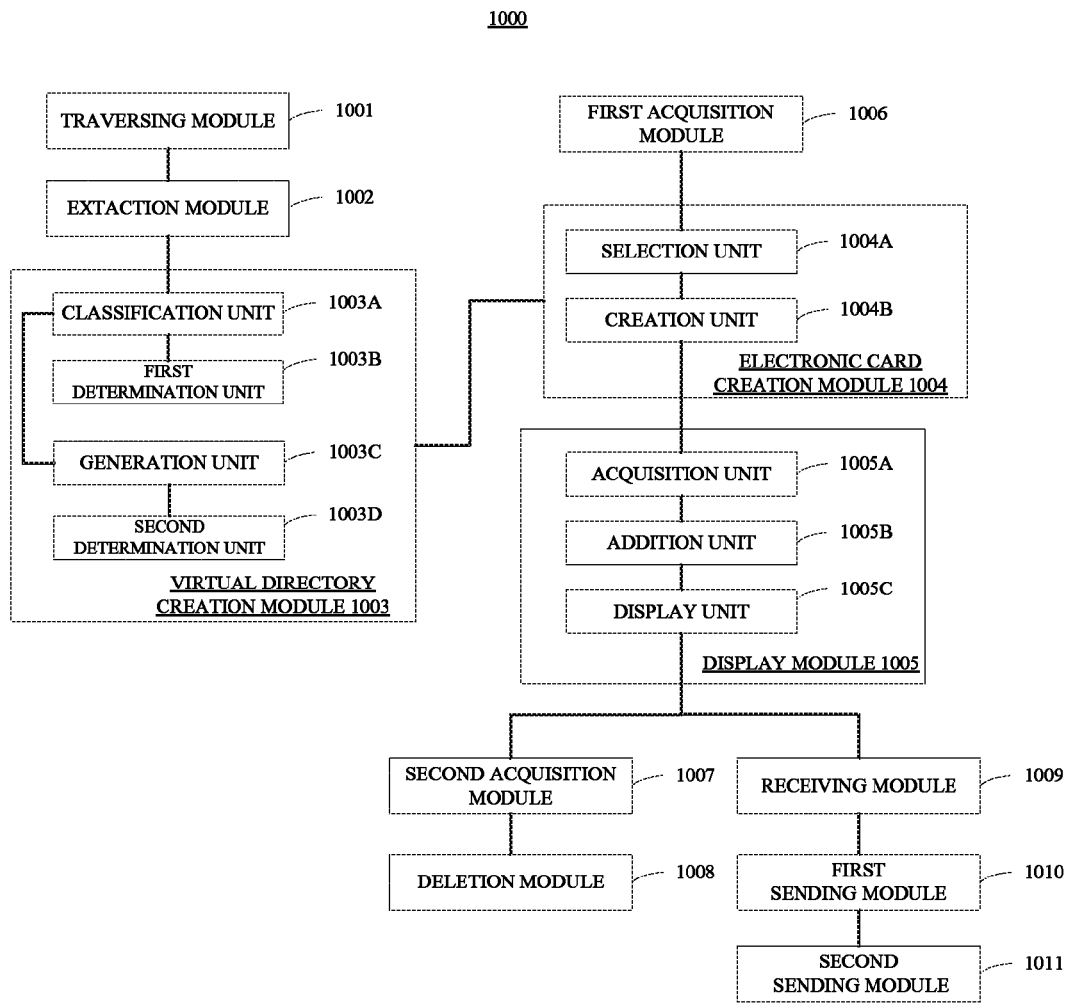
FIG. 10 is a block diagram showing an apparatus for creating a virtual directory according to an embodiment.

FIG. 10 illustrates a block diagram of another exemplary apparatus 1000 for creating a virtual directory consistent with embodiments of the disclosure. The apparatus 1000 includes, but is not limited to, a traversing module 1001, an extraction module 1002, and a virtual directory creation module 1003.

The traversing module 1001 is configured to traverse files of a designated type in a storage region.

The extraction module 1002 is configured to extract attribute information of the files of the designated type traversed by the traversing module 1001. In some embodiments, the attribute information includes at least name and play addresses of the files of the designated type. In some embodiments, the attribute information also includes episode information The virtual directory creation module 1003 is configured to create a virtual directory according to the attribute information of the files of the designated type extracted by the extraction module 1002.

In some embodiments, the virtual directory creation module 1003 includes a classification unit 1003A, a first setting unit 1003B, a generation unit 1003C, and a second setting unit 1003D.

The classification unit 1003A is configured to group the attribute information with the same name into a class.

The first setting unit 1003B is configured to, when the class created by the classification unit 1003A includes one piece of attribute information, set the attribute information as a node in a first-level directory of the virtual directory. The node includes a name and a play address of a file of the designated type corresponding to the attribute information.

The generation unit 1003C is configured to, when the class created by the classification unit 1003 includes at least two pieces of attribute information and the attribute information includes episode information, generate a node in the first-level directory for the class. The node includes at least a name of files of the designated type corresponding to the attribute information in the class.

The second setting unit 1003D is configured to set respective pieces of attribute information in the class as sub-nodes in a second-level directory of the virtual directory, under the node in the first-level directory generated by the generation unit 1003C. The sub-nodes include name, play addresses, and episode information of the files of the designated type corresponding to the attribute information.

In some embodiments, the generation unit 1003C includes a creation sub-unit, a first setting sub-unit, a second setting sub-unit, and a third setting sub-unit.

The creation sub-unit is configured to create a node in the first-level directory corresponding to the class.

The first setting sub-unit is configured to set a name in the attribute information in the class as a name of the node in the first-level directory created by the creation sub-unit.

The second setting sub-unit is configured to set the number of the pieces of attribute information in the class as total-episode-number information in the node in the first-level directory created by the creation sub-unit.

The third setting sub-unit is configured to set the name set by the first setting sub-unit and the total-episode-number information set by the second setting sub-unit as contents included in the node.

In some embodiments, the apparatus 1000 further includes an electronic card creation module 1004 and a display module 1005.

The electronic card creation module 1004 is configured to create an electronic card for the node in the first-level directory according to the attribute information corresponding to the node.

The display module 1005 is configured to display, in a designated display area, the electronic card corresponding to the node in the first-level directory.

In some embodiments, the display module 1005 includes an acquisition unit 1005A, an addition unit 1005B, and a display unit 1005C.

The acquisition unit 1005A is configured to acquire poster information of the file of the designated type corresponding to the node in the first-level directory. The poster information includes a picture indicating contents of the file of the designated type.

The addition unit 1005B is configured to add the poster information acquired by the acquisition unit 1005A to the electronic card corresponding to the node.

The display unit 1005C is configured to display, in the designated display area. the electronic card having the poster information and corresponding to the node.

In some embodiments, the node in the first-level directory further includes a category of the file of the designated type corresponding to the attribute information corresponding to the node. The apparatus 1000 further includes a first acquisition module 1006.

The first acquisition module 1006 is configured to acquire a displaying request containing a designated category.

The electronic card creation module 1004 includes a selection unit 1004A and a creation unit 1004B.

The selection unit 1004A is configured to select a node in the first-level directory that has attribute information containing the designated category.

The creation module 1004B is configured to create an electronic card for the selected node according to the attribute information corresponding to the node selected by the selection unit 1004A.

The display module 1005 may be further configured to display, in a designated display area, the electronic card corresponding to the selected node.

In some embodiments, the node in the first-level directory further includes a category of the file of the designated type corresponding to the attribute information corresponding to the node. The apparatus 1000 further includes a second acquisition module 1007 and a deletion module 1008.

The second acquisition module 1007 is configured to acquire a displaying request containing a designated category.

The deletion module 1008 is configured to delete an electronic card displayed in the designated display area and corresponding to attribute information that does not have the designated category.

In some embodiments, the apparatus 1000 further includes a receiving module 1009, a first sending module 1010, and a second sending module 1011.

The receiving module 1009 is configured to receive a playing request generated when a user selects an electronic card in the designated display area. The playing request includes attribute information corresponding to the electronic card.

The first sending module 1010 is configured to, when attribute information in the playing request received by the receiving module 1009 contains a play address, send the play address in the attribute information corresponding to the electronic card to a player, so that the player plays a file of the designated type corresponding to the electronic card according to the play address in the attribute information.

The second sending module 1011 is configured to, when attribute information in the playing request received by the receiving module 1009 does not contain a play address, send play addresses in attribute information of all of the sub-nodes of the node corresponding to the electronic card to a player, so that the player plays, according to the play addresses in the attribute information in the sub-nodes, files of the designated type corresponding to the sub-nodes.

As described above, apparatuses consistent with the disclosure overcome problems in conventional technologies by acquiring all the files of a designated type in a designated storage region and creating a virtual directory, including a first-level directory and a second-level directory, according to attribute information of the acquired files of the designated type, providing corresponding poster information for electronic cards of the first-level directory, and displaying the electronic cards of the first-level directory that contain the poster information in a designated display area. In addition, since all files of the same designated type in respective partitions of an electronic device and external devices are placed uniformly in a virtual directory, the desired files of the designated type can be directly located in the virtual directory. Further, by adding poster information to electronic cards that need to be displayed, the user can more intuitively locate the electronic card that he/she needs. As a result, quick locating of the desired files of the designated type is realized.

It should be noted that the above apparatuses for creating a virtual directory are described using the above functional modules as examples. In practical application, the above functions can be assigned to different functional modules as desired. That is, the internal structure of the electronic device can be divided into different functional modules to accomplish all or part of the functions described above. Further, the embodiments of the apparatuses and methods for creating a virtual directory belong to the same concept, and the specific operating procedure of the apparatuses can be referred to in the embodiments of the methods. Therefore, the description thereof is omitted.

Figure 11:
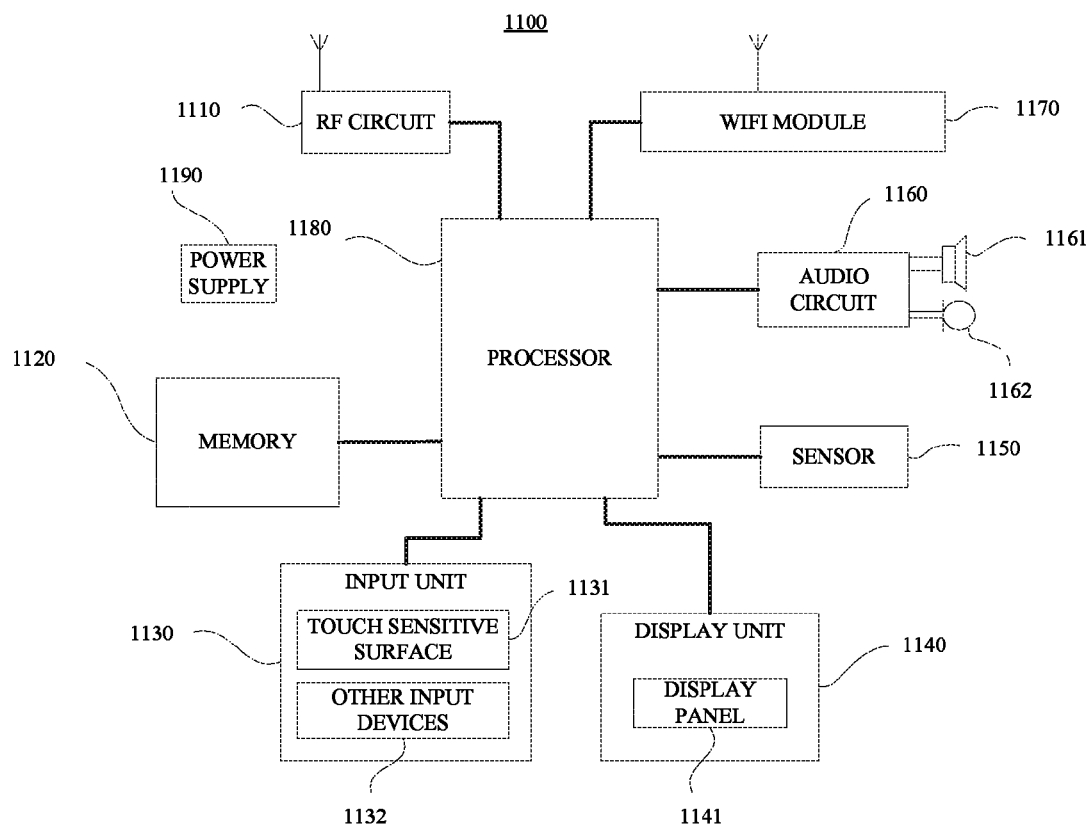
FIG. 11 is a block diagram showing an electronic device according to an embodiment.

FIG. 11 illustrates a block diagram of an exemplary electronic device 1100 consistent with embodiments of the disclosure. The electronic device 1100 is configured to implement the methods of creating a virtual directory described above. The electronic device includes one or more components as below: a processor configured to execute computer program instructions to implement various flow and method, a random access memory (RAM) and a read only memory (ROM) configured to store information and program instructions, a memory configured to store data and information, a database configured to store table, directory, and other data structure, a I/O device, an interface, and antenna, etc.

Specifically, as shown in FIG. 11, the electronic device 1100 includes an RF circuit (Radio Frequency) circuit 1110, a memory 1120 including one or more computer-readable storage mediums, an input unit 1130, a display unit 1140, a sensor 1150, an audio circuit 1160, a short-range wireless transmission (such as WiFi) module 1170, a processor 1180 including one or more processing cores, and a power supply 1190. The electronic device 1100 may also include one or more other components. Those skilled in the art would appreciate that the structure of the electronic device shown in FIG. 11 does not constitute a limitation to the electronic device consistent with embodiments of the disclosure, which may include more or less components than those illustrated in FIG. 11. Some of the components shown in FIG. 11 may be combined, or be replaced by different components.

The radio frequency circuit 1110 is configured to transmit or receive signals during transmitting and receiving of information or during communication. In particular, after receiving downlink information from a base station, the radio frequency circuit 1110 transmits the information to one or more processors 1180 to process. Also, the radio frequency circuit 1110 transmits uplink data to the base station. Generally, the radio frequency circuit 1110 as a communication unit includes, but is not limited to, an antenna, at least one amplifier, a tuner, one or more oscillators, a subscriber identity module (SIM) card, a transceiver, a coupler, a LNA (Low Noise Amplifier), a duplexer, etc. Furthermore, the radio frequency circuit 1110 may communicate with other devices through a wireless network and Internet. The wireless network may use any communication standards or protocols, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service), etc.

The memory 1120 is configured to store software programs and modules. The processor 1180 implements various functions and data processing by running the software programs and modules stored in the memory 1120. The memory 1120 may mainly include a programs storage area and a data storage area, wherein the programs storage area may store an operation system program, an application required by at least one function (such as a function of sound playback, a function of image playback, etc.), etc., and the data storage area may store data (such as audio data, phone book, etc.) created during the operation of the electronic device 1100, etc. In addition, the memory 1120 may include a high-speed random access memory and may also include a non-volatile memory, such as at least one disk storage device or a flash memory device, or other volatile solid-state memory devices. Correspondingly, the memory 1120 may also include a memory controller to provide access for the processor 1180 and the input unit 1130 to the memory 1120.

The input unit 1130 is configured to receive the input numbers or characters, and generate keyboard, mouse, joystick, optical, or trackball input signals related to a user setting and a functional control. Specifically, as shown in FIG. 11, the input unit 1130 may include a touch sensitive surface 1131 and other input devices 1132. The touch sensitive surface 1131, also known as a touch screen or a track pad, collects touch operations on or near the touch sensitive surface 1131 from a user (such as an operation on or near the touch sensitive surface 1131 by a user using any suitable object or accessory component such as a finger, a stylus and the like), and drives a corresponding connection device according to a preset routine. Alternatively, the touch sensitive surface 1131 may include both of a touch detection device and a touch controller. Here, the touch detection device detects a touching position of a user and a signal caused by the touch operation, and transmits the signal to the touch controller. The touch controller receives touch information from the touch detection device, transforms it into coordinates of the touch point, and sends it to the processor 1180. The touch controller may also receive a command from the processor 1180 and execute the command In addition, the touch sensitive surface 1131 may be realized in various types, such as a resistive, capacitive, infrared, or acoustic wave type. In addition to the touch sensitive surface 1131, the input unit 1130 also includes other input device 1132. Specifically, the other input device 1132 may include, but is not limited to, one or more of a physical keyboard, function buttons (such as volume control buttons, switch buttons, etc.), a trackball, a mouse, an operation lever, etc.

The display unit 1140 is configured to display information input by the user or information provided to the user and various graphical user interfaces of the electronic device 1100. These graphical user interfaces may include graphics, text, icon, video, or any combination thereof. The display unit 1140 includes a display panel 1141, which may include, for example, an LCD (Liquid Crystal Display) or an OLED (Organic Light-Emitting Diode). Further, the touch sensitive surface 1131 may cover the display panel 1141. When the touch sensitive surface 1131 detects a touch operation thereon or near, the touch operation is sent to the processor 1180 to determine the type of the touch event. The processor 1180 provides a corresponding visual output on the display panel 1141 according to the type of the touch event. Although the touch sensitive surface 1131 and the display panel 1141 in FIG. 11 are two separate components to accomplish the input function and the output function respectively, in some embodiments, the touch sensitive surface 1131 and the display panel 1141 may be integrated into one component to realize both the input and output functions The electronic device 1100 further includes at least one sensor 1150, such as a light sensor, a motion sensor, etc. Specifically, the light sensor may include an ambient light sensor and a proximity sensor. The ambient light sensor may adjust the brightness of the display panel 1141 according to the brightness of the ambient light. The proximity sensor may turn off the display panel 1141 and/or backlight when the electronic device 1100 moves close to an ear. The motion sensor may include a gravity sensor that detects the amplitude of the acceleration in each direction (typically in three axes), and detects the amplitude and the direction of the gravity while in a stationary state. Such information can be provided to applications that need to recognize the attitudes of the electronic device (such as horizontal-vertical screen switching, related games, attitudes calibration of a magnetometer), or applications that need vibration recognition (such as a pedometer, clicking), etc. The electronic device 1100 may also be equipped with other sensors such as a gyroscope, a barometer, a hygrometer, a thermometer, an infrared sensor, etc., the description of which is omitted herein.

The audio circuit 1160, a speaker 1161 and a microphone 1162 provide an audio interface between the user and the electronic device 1100. The audio circuit 1160 may transform the received audio data into an electrical signal which is transmitted to the speaker 1161 and transformed into a sound signal to be output by the speaker 1161. On the other hand, the microphone 1162 transforms the collected sound signal into an electrical signal which is received and transformed into audio data by the audio circuit 1160, and then the audio data, after being output to the processor 1180 to be processed, is transmitted to, for example, another electronic device via the RF circuit 1110 or output to the memory 1120 for further processing. The audio circuit 1160 may also include a headphone jack to allow a communication between an external headphone and the electronic device 1100.

The short-range wireless transmission module 1170 may be a WIFI (wireless fidelity) module or a Bluetooth module or the like. The electronic device 1100 may allow a user to send and receive emails, browse webpages and access streaming medias, etc., through the short-range wireless transmission module 1170 which provides a wireless broadband Internet access. Although FIG. 11 shows the short-range wireless transmission module 1170, it should be understood that the short-range wireless transmission module 1170 is not a necessary component of the electronic device 1100, and may be omitted as desired without change the substantive scope of the invention.

The processor 1180 is a control center of the electronic device 1100 that connects various parts of the entire electronic device 1100 through various interfaces and circuits, performs various functions and processes data by running and executing software programs and/or modules stored in the memory 1120 and calling the data stored in the memory 1120, to monitor the entire electronic device 1100. Alternatively, the processor 1180 may include one or more processing cores. For example, the processor 1180 may be integrated with an application processor that mainly processes an operation system, a user interface and applications, and a modem processor that mainly processes the wireless communication. It should be understood that the modem processor may be not integrated in the processor 1180.

The electronic device 1100 also includes the power supply 1190 (such as a battery) to supply power to each component. In some embodiments, the power supply 1190 may be logically connected to the processor 1180 through a power supply management system, so as to manage the functions such as charging, discharging and power consumption, etc., through the power supply management system. The power supply 1190 may also include any one or more components of an AC or DC power, a recharging system, a power fault detection circuit, a converter or an inverter, a power status indicator, etc.

Although not shown, the electronic device 1100 may also include a camera, a Bluetooth module, a touch screen, etc, the details of which are not repeated herein. In such embodiments, the display unit 1140 of the electronic device 1100 is a touch screen display.

In addition to the one or more processors 1180, the electronic device 1100 further includes a memory that stores one or more modules configured to be executable by the one or more processors 1180. The one or more modules perform methods including traversing files of the designated type in a storage region, extracting attribute information of the traversed files of the designated type, and creating a virtual directory according to the attribute information on the files of the designated type. In some embodiments, the attribute information includes at least name and play addresses of the files of the designated type. In some embodiments, the attribute information also includes episode information.

In some embodiments, creating a virtual directory according to the attribute information of the files of the designated type may include grouping the attribute information with the same name into one class. If the class includes only one piece of attribute information, the attribute information is set as a node in a first-level directory of the virtual directory. The node includes the name and play addresses of the files of the designated type corresponding to the attribute information.

If the class includes at least two pieces of attribute information and the attribute information includes the episode information, a node in the first-level directory is generated for the class. The node includes at least the name of the files of the designated type corresponding to the attribute information in the class. Then the respective pieces of attribute information in the class are set as sub-nodes in a second-level directory of the virtual directory under the node in the first-level directory, respectively. The sub-nodes include the name, play addresses, and episode information of the files of the designated type corresponding to the attribute information.

In some embodiments, generating a node in the first-level directory for the class includes creating a node corresponding to the class in the first-level directory, setting a name in the attribute information in the class as a name of the node in the first-level directory, setting the number of pieces of attribute information in the class as total-episode-number information of the node in the first-level directory, and setting the name and the total-episode-number information as contents included in the node.

In some embodiments, the methods according to the disclosure may further include creating an electronic card for the node in the first-level directory according to the attribute information corresponding to the node, and displaying the electronic card corresponding to the node in the first-level directory in a designated display area.

In some embodiments, displaying the electronic card corresponding to the node in the first-level directory in the designated display area may include acquiring poster information of the files of the designated type corresponding to the node in the first-level directory, adding the poster information to the electronic card corresponding to the node, and displaying the electronic card having the poster information and corresponding to the node in the designated display area. In some embodiments, the poster information is a picture indicating contents of the files of the designated type.

In some embodiments, the node in the first-level directory further includes a category of the files of the designated type corresponding to the attribute information corresponding to the node. In such embodiments, the method consistent with the disclosure further includes acquiring a displaying request containing a designated category. Further, creating the electronic card for the node according to the attribute information corresponding to the node in the first-level directory includes selecting, in the first-level directory, a node corresponding to the attribute information containing the designated category, creating the electronic card for the selected node according to the attribute information corresponding to the selected node, Similarly, displaying the electronic card corresponding to the node in the first-level directory in the designated display area includes displaying an electronic card corresponding to the selected node in the designated display area.

In some embodiments, the node in the first-level directory further includes a category of the files of the designated type corresponding to the attribute information corresponding to the node. In such embodiments, the method consistent with the disclosure further includes acquiring a displaying request containing a designated category, and deleting an electronic card already displayed in the designated display area and corresponding a category different from the designated category.

In some embodiments, the method according to the disclosure may further include receiving a playing request. The playing request is generated when a user selects an electronic card in the designated display area and includes attribute information corresponding to the electronic card. If the attribute information in the playing request contains a play address, then the play address in the attribute information corresponding to the electronic card is sent to a player, so that the player can play files of the designated type corresponding to the electronic card according to the play address in the attribute information. On the other hand, if the attribute information in the playing request does not contain a play address, play addresses in attribute information of all sub-nodes of the node corresponding to the electronic card are sent to a player, so that the player can play files of the designated type corresponding to the sub-nodes according to the play addresses in the attribute information of the sub-nodes.

As described above, electronic devices consistent with the disclosure overcome problems in conventional technologies by acquiring all the files of a designated type in a designated storage region and creating a virtual directory according to attribute information of the acquired files of the designated type. In addition, since all files of the same designated type in respective partitions of an electronic device and external devices are placed uniformly in a virtual directory, the desired files of the designated type can be directly located in the virtual directory, thereby realizing quick locating of the desired files of the designated type.

Those skilled in the art would recognize that part or all of the methods described above may be implemented with hardware, or programs instructing the related hardware. The programs may be stored in a computer readable storage medium. The storage medium described as above may be a read-only memory, a magnetic disc, an optical disc or the like.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for creating a virtual directory, comprising:
    traversing a storage region to locate a plurality of files of a designated type stored in the storage region;
    extracting attribute information of each of the plurality of files stored in the storage region, the attribute information including at least two of a name, a play address, or episode information of each of the plurality of files; and
    creating a virtual directory according to the extracted attribute information, including:
        grouping the attribute information of each of the plurality of files that includes a certain name into a class; and
        generating a node in a first-level directory of the virtual directory according to the grouped attribute information, the node including the certain name;
    wherein the class includes at least two pieces of attribute information and the at least two pieces of attribute information include episode information,
    the method further comprising:
        setting the at least two pieces of attribute information in the class as sub-nodes in a second-level directory of the virtual directory under the node in the first-level directory, each of the sub-nodes including the certain name, a play address and episode information of a file of the designated type corresponding to one of the at least two pieces of attribute information.

2. The method according to claim 1, wherein generating the node in the first-level directory for the class includes:
    setting the certain name as a node name of the node in the first-level directory;
    setting a number of the at least two pieces of attribute information in the class as total-episode-number information for the node in the first-level directory; and
    setting the node name and the total-episode-number information as contents comprised in the node.

3. The method according to claim 1, further comprising:
    creating an electronic card for the node in the first-level directory according to the grouped attribute information; and displaying, in a designated display area, the electronic card.

4. The method according to claim 3, further comprising:
acquiring poster information of a file of the designated type corresponding to the node in the first-level directory, the poster information including a picture indicating a content of the file of the designated type corresponding to the node; and
adding the poster information to the electronic card.

5. The method according to claim 3, further comprising:
acquiring a displaying request including a designated category;
checking whether the node corresponding to the displayed electronic card includes the designated category; and
if the node corresponding to the displayed electronic card does not include the designated category, deleting the displayed electronic card from the designated display area.

6. The method according to claim 3, further comprising:
receiving a playing request generated by a user selecting the electronic card;
if the playing request includes a play address, sending the play address to a player, so that the player plays a file of the designated type corresponding to the electronic card according to the play address; and
if the playing request does not include a play address, sending play addresses in the attribute information of sub-nodes of the node corresponding to the electronic card to the player, so that the player plays, according to the play addresses in the attribute information of the sub-nodes, files of the designated type corresponding to the sub-nodes.

7. The method according to claim 1,
wherein a plurality of nodes are generated in the first-level directory, each of the nodes further including a category to which a file of the designated type corresponding to the node belongs,
the method further comprising:
acquiring a displaying request including a designated category;
selecting one of the plurality of nodes that includes the designated category;
creating an electronic card for the selected node according to the at least one piece of attribute information corresponding to the selected node; and
displaying the electronic card corresponding to the selected node in a designated display area.

8. An electronic device, comprising:
a processor; and
a memory storing instructions, which, when executed by the processor, cause the electronic device to:
traverse a storage region to locate a plurality of files of a designated type stored in the storage region;
extract attribute information of each of the plurality of files stored in the storage region, the attribute information including at least two of a name, a play address, or episode information of each of the plurality of files; and
create a virtual directory according to the extracted attribute information, including:
grouping the attribute information of each of the plurality of files that includes a certain name into a class; and
generating a node in a first-level directory of the virtual directory according to the grouped attribute information, the node including the certain name;

wherein the class includes at least two pieces of attribute information and the at least two pieces of attribute information include episode information, and the instructions further cause the electronic device to:
set the at least two pieces of attribute information in the class as sub-nodes in a second-level directory of the virtual directory under the node in the first-level directory, each of the sub-nodes including the certain name, a play address, and episode information of a file of the designated type corresponding to one of the at least two pieces of attribute information.

9. The electronic device according to claim 8, wherein the instructions further cause the electronic device to:
set the certain name as a node name of the node in the first-level directory;
set a number of the at least two pieces of attribute information in the class as total-episode-number information for the node in the first-level directory; and
set the node name and the total-episode-number information as contents comprised in the node.

10. The electronic device according to claim 8, wherein the instructions further cause the electronic device to:
create an electronic card for the node in the first-level directory according to the grouped attribute information; and
display, in a designated display area, the electronic card.

11. The electronic device according to claim 10, wherein the instructions further cause the electronic device to:
acquire poster information of a file of the designated type corresponding to the node in the first-level directory, the poster information including a picture indicating a content of the file of the designated type corresponding to the node; and
add the poster information to the electronic card.

12. The electronic device according to claim 10, wherein the instructions further cause the electronic device to:
acquire a displaying request including a designated category;
check whether the node corresponding to the displayed electronic card includes the designated category; and
if the node corresponding to the displayed electronic card does not include the designated category, delete the displayed electronic card from the designated display area.

13. The electronic device according to claim 10, wherein the instructions further cause the electronic device to:
receive a playing request generated by a user selecting the electronic card;
if the playing request includes a play address, send the play address to a player, so that the player plays a file of the designated type corresponding to the electronic card according to the play address; and
if the playing request does not include a play address, send play addresses in the attribute information of sub-nodes of the node corresponding to the electronic card to the player, so that the player plays, according to the play addresses in the attribute information of the sub-nodes, files of the designated type corresponding to the sub-nodes.

14. A non-transitory computer-readable storage medium storing instructions, which, when executed by a processor in an electronic device, cause the electronic device to:
traverse a storage region to locate a plurality of files of a designated type stored in the storage region;
extract attribute information of each of the plurality of files stored in the storage region, the attribute information including at least two of a name, a play address, or episode information of each of the plurality of files; and create a virtual directory according to the extracted attribute information, including:

grouping the attribute information of each of the plurality of files that includes a certain name into a class; and generating a node in a first-level directory of the virtual directory according to the grouped attribute information, the node including the certain name;

wherein the class includes at least two pieces of attribute information and the at least two pieces of attribute information include episode information, and the instructions further cause the electronic device to:

set the at least two pieces of attribute information in the class as sub-nodes in a second-level directory of the virtual directory under the node in the first-level directory, each of the sub-nodes including the certain name, a play address, and episode information of a file of the designated type corresponding to one of the at least two pieces of attribute information.

* * * * *